(12) United States Patent
Chisholm et al.

(10) Patent No.: US 10,895,516 B2
(45) Date of Patent: Jan. 19, 2021

(54) SEAL INTEGRITY INSPECTION

(71) Applicant: Owens-Brockway Glass Container Inc., Perrysburg, OH (US)

(72) Inventors: Brian J Chisholm, Sylvania, OH (US); Brian J Brozell, Maumee, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 155 days.

(21) Appl. No.: 16/269,351

(22) Filed: Feb. 6, 2019

(65) Prior Publication Data
US 2020/0249116 A1     Aug. 6, 2020

(51) Int. Cl.
| | |
|---|---|
| *G06K 9/00* | (2006.01) |
| *G01M 3/38* | (2006.01) |
| *G06T 7/50* | (2017.01) |
| *B65B 57/00* | (2006.01) |
| *G06T 7/00* | (2017.01) |

(52) U.S. Cl.
CPC ............... *G01M 3/38* (2013.01); *B65B 57/00* (2013.01); *G06T 7/0004* (2013.01); *G06T 7/50* (2017.01)

(58) Field of Classification Search
CPC ........ B65B 57/00; G01M 3/38; G06T 7/0004; G06T 7/50
See application file for complete search history.

(56) References Cited

U.S. PATENT DOCUMENTS

| | | |
|---|---|---|
| 5,111,684 A | 5/1992 | Stauffer et al. |
| 5,249,454 A | 10/1993 | Kollie et al. |
| 5,848,514 A | 12/1998 | Edwards et al. |
| 5,863,752 A | 1/1999 | Court et al. |
| 6,167,751 B1 | 1/2001 | Fraim et al. |
| 7,559,232 B2 | 7/2009 | Meckl |
| 7,665,346 B1 | 2/2010 | Stauffer et al. |
| 7,712,351 B2 | 5/2010 | Vissers |
| 10,669,054 B1* | 6/2020 | Hoffman ................. B65B 47/00 |

(Continued)

FOREIGN PATENT DOCUMENTS

| | | |
|---|---|---|
| EP | 2584334 A1 | 4/2013 |
| GB | 62384554 A | 7/2003 |

(Continued)

OTHER PUBLICATIONS

Written Opinion & International Search Report for PCT/US2020/016696 dated May 26, 2020, 21 pages.

*Primary Examiner* — Xin Jia

(57) ABSTRACT

An apparatus for inspecting the integrity of a seal of a package that includes a container and a seal membrane carried by the container. The apparatus comprises a conveyor configured to move the sealed package along a path and including a vacuum plenum section configured to create a sub-atmospheric pressure that is applied to the seal membrane of the sealed package as the package moves through the vacuum plenum section. The apparatus further comprises an imaging sensor configured to generate one or more images of the seal membrane following the application of a sub-atmospheric pressure thereto at the vacuum plenum section. The apparatus still further comprises an electronic processing device configured to process the one or more images of the seal membrane generated by the imaging sensor, and to evaluate the integrity of the seal of the package based on the one or more images.

21 Claims, 3 Drawing Sheets

(56) References Cited

U.S. PATENT DOCUMENTS

| | | |
|---|---|---|
| 2003/0033857 A1 | 2/2003 | Franks |
| 2010/0035739 A1 | 2/2010 | Gysi et al. |
| 2013/0141571 A1* | 6/2013 | Yasooka ................. G01M 3/36 |
| | | 348/135 |

FOREIGN PATENT DOCUMENTS

| | | |
|---|---|---|
| JP | S5944637 A | 3/1984 |
| JP | 2012037496 A | 2/2012 |
| WO | WO9927340 A1 | 6/1999 |
| WO | WO2011098788 A1 | 8/2011 |

* cited by examiner

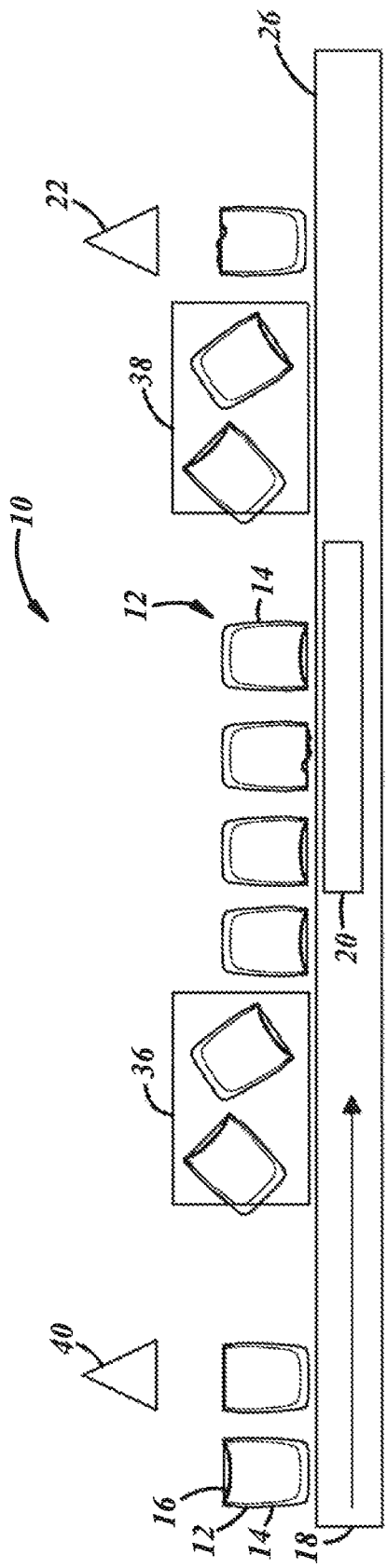
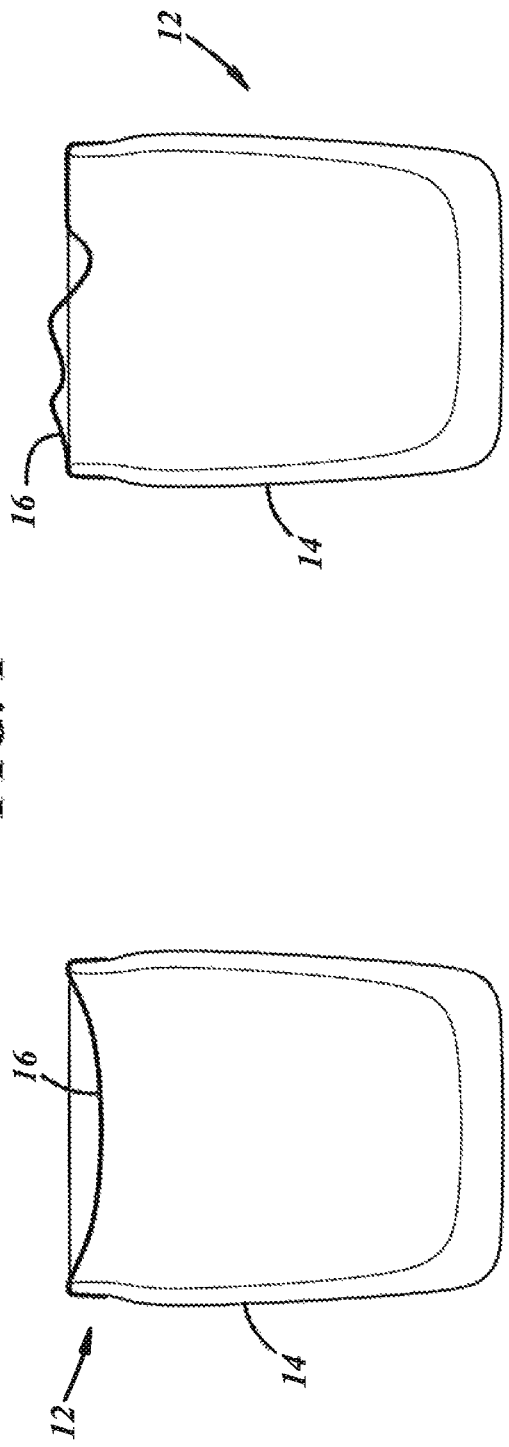

SEAL INTEGRITY INSPECTION

The present disclosure is directed to sealed packages and, more particularly, to methods and systems for inspecting the integrity of the seals of sealed packages.

BACKGROUND AND SUMMARY OF THE DISCLOSURE

It is well known that the container of a sealed package, for example, a glass container, may be filled using what is commonly known as a "hot-fill" process. In such a process, the contents to be packaged in the container are introduced into the container at an elevated temperature. Once filled, the contents of the container may cool naturally or be subject to a cooling process.

It is also well known that hot-filled containers may be sealed with a seal membrane, for example, a foil membrane (e.g., an inelastic foil membrane), thereby forming a sealed package. In some instances, the container may be sealed immediately after the filling of the container and before the cooling of the contents of the container. For containers sealed in this way, the cooling of the contents in the container causes both hot gas and the contents in the container to condense. This, in turn, causes a vacuum to be formed in the package. The vacuum draws the foil membrane into a concave parabolic shape that is maintained so long as a vacuum is maintained within the package. However, in certain instances, the parabolic shape may also be maintained even if there is a loss of vacuum. For example, in an instance where there is, for example, a puncture in the seal membrane (e.g., foil) or a failure of the seal between the seal membrane and the sealing surface of the container, and no external forces are applied, the foil membrane may nevertheless maintain the parabolic shape even though the seal has been compromised, and thus, vacuum within the package lost. A general object of the present disclosure, in accordance with at least one aspect of the disclosure, is to provide a method and system for inspecting packages to allow for the detection of conditions where, although the membrane has a parabolic shape, the integrity of the package seal has nonetheless been compromised.

The present disclosure embodies a number of aspects that can be implemented separately from, or in combination with, each other.

In accordance with one aspect of the disclosure, an apparatus for inspecting the integrity of a seal of a package that includes a container and a seal membrane carried by the container is provided. The apparatus comprises a conveyor configured to move the package along a path. The conveyor includes a vacuum plenum section configured to create a sub-atmospheric pressure that is applied to the seal membrane of the package as the package moves through the vacuum plenum section. The apparatus further comprises an imaging sensor configured to generate one or more images of the seal membrane of the package following the application of the sub-atmospheric pressure thereto at the vacuum plenum section. The apparatus still further comprises an electronic processing device configured to process the one or more images of the seal membrane generated by the imaging sensor, and to evaluate the integrity of the seal of the package based on the one or more images.

In accordance with another aspect of the disclosure, there is provided an apparatus for inspecting the integrity of a seal of a package that includes a container and a seal membrane carried by the container. The apparatus comprises a conveyor configured to move the package along a path. The conveyor includes a vacuum plenum section configured to create a sub-atmospheric pressure that is applied to the seal membrane of the package as the package moves through the vacuum plenum section of the conveyor. The vacuum plenum section includes a vacuum plenum that is disposed beneath the conveyor. The apparatus further comprises a first inverter configured to invert the package prior to the application of a vacuum to the seal membrane at the vacuum plenum section of the conveyor, and a second inverter configured to invert the package following the application of a vacuum to the seal membrane at the vacuum plenum section of the conveyor. The apparatus still further comprises an imaging sensor configured to generate one or more images of the seal membrane of the package following the application of the sub-atmospheric pressure thereto at the vacuum plenum section of the conveyor, and an electronic processing device configured to process the one or more images of the seal membrane generated by the imaging sensor, and to evaluate the integrity of the seal of the package based on the one or more images.

In accordance with yet another aspect of the disclosure there is provided a method for inspecting the integrity of a seal of a package that includes a container and a sealing membrane carried thereby. The method comprises moving, by a conveyor, the package through a vacuum plenum section of the conveyor, and applying, by a vacuum plenum section of the conveyor, a sub-atmospheric pressure to the seal member of the package as the package passes through the vacuum plenum section. The method further comprises acquiring, by an imaging sensor, one or more images of the seal membrane following the application of the sub-atmospheric pressure thereto, and processing the one or more images to evaluate the integrity of the seal of the package.

BRIEF DESCRIPTION OF THE DRAWING

The disclosure, together with additional objects, features, advantages and aspects thereof, will be best understood from the following description, the appended claims, and the accompanying drawings, in which:

FIG. 1 is a diagrammatic view of an illustrative embodiment of an apparatus for inspecting the integrity of a seal of a package;

FIG. 3 is an elevation view of a package having an uncompromised seal;

FIG. 4 is an elevation view of a package having a compromised seal; and

DETAILED DESCRIPTION

FIG. 1 depicts a diagrammatic illustration of one embodiment of a system 10 for inspecting the integrity of a seal of a package or sealed package 12, for example, a container 14 sealed with a seal membrane 16. The container 14 may comprise, for example, a bottle, a jar, a jug, or another suitable container in which any number of goods or products may be packaged, including, for example and without limitation, various types of food products and other liquids, gels, powders, particles, and the like. The container 14 may be formed of glass or another suitable material for packaging goods/products, for example, those goods/products identified above. The seal membrane 16 of the package 12 may also comprise any suitable material, for example, foil (e.g., inelastic foil), and may be affixed, adhered, or attached to a sealing surface of the container 14 using known processes and/or techniques.

One particular type of package that system 10 may be used to inspect is a hot-filled, foil-sealed package that is sealed immediately after filling the container with a hot product and the package is then cooled. As described elsewhere above, the cooling of the package and the product packaged therein causes both hot gas and the product in the container of the package to condense, which, in turn, causes a vacuum to be formed in the package. The vacuum draws the seal membrane (e.g., foil) into a parabolic shape that is maintained so long as a vacuum is maintained within the package. It will be appreciated, however, that the system 10 may also be used to inspect other types of sealed packages, and therefore, the present disclosure is not limited to the inspection of any particular type(s) of sealed package(s).

Figure 2:
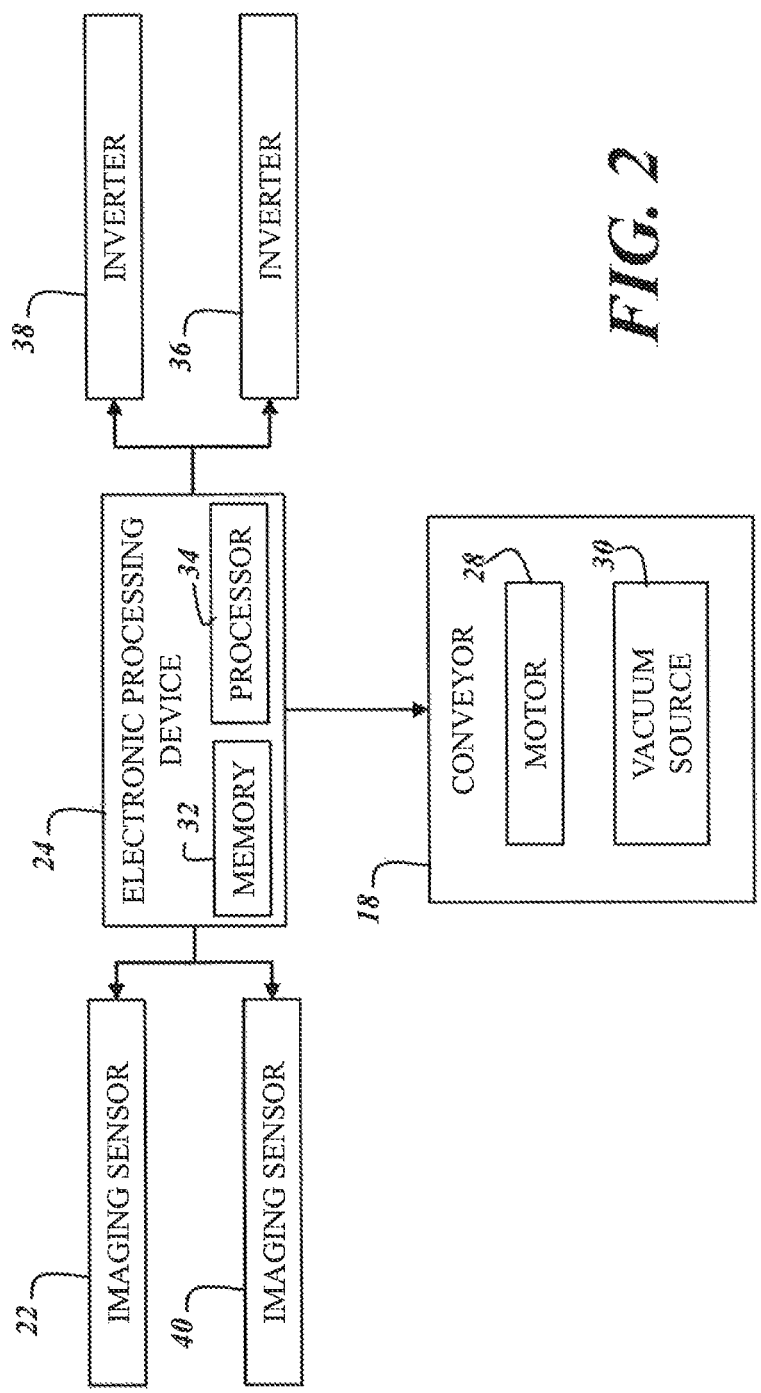
FIG. 2 is a schematic and diagrammatic view of the illustrative embodiment of the apparatus illustrated in FIG. 1.

As shown in FIGS. 1 and 2, in an illustrative embodiment, the system 10 includes a conveyor or conveyor system 18 having a vacuum plenum section 20, an imaging sensor 22, and an electronic processing device 24.

The conveyor 18 is configured to move a sealed package 12 being inspected along a path that includes the vacuum plenum section 20. The conveyor 18 may comprise any conveyor system known in the art that is suitable for the purposes described herein. For example, in one illustrative embodiment, the conveyor 18 comprises a motor-driven conveyor having a conveyor belt 26 on which packages being inspected are placed and that moves the package(s) along the path of the conveyor 18. In an embodiment, and for reasons that will be apparent in view of the description below, at least one or more portions of the conveyor belt 26 has one or more perforations or holes therein. The perforations or holes allow air to be drawn through the conveyor belt 26 when a portion of the conveyor belt 26 having such perforations/holes is located within the vacuum plenum section 20 of the conveyor 18 and a sub-atmospheric pressure created by the vacuum plenum section is applied to the seal membrane 16 of a package 12 on the conveyor belt 26. In an embodiment, the entire length of the belt has perforations or holes disposed therein, while in other embodiments, only one or more portions, but not the entirety of the belt 26, has/have perforations/holes therein.

The vacuum plenum section 20 of conveyor 18 generally includes a vacuum plenum and a vacuum source that together are configured to create a sub-atmospheric pressure (also referred to herein as a vacuum) and to apply the sub-atmospheric pressure to the seal membrane 16 of the package 12 as the package 12 moves through the vacuum plenum section 20 of the conveyor 18. In operation, a package 12 is moved to the vacuum plenum section 20 of the conveyor 18 and a sub-atmospheric pressure is applied to the seal membrane 16 thereof. If the seal of the package is "good" or uncompromised (i.e., there are no punctures in the seal membrane 16 or seal failures), the seal membrane 16 may or may not be drawn down to the conveyor belt 26 by the applied sub-atmospheric pressure, but in any instance, will at the very least return to its original parabolic shape under influence of the vacuum within the package 12 when the sub-atmospheric pressure is removed or its application ceased. FIG. 3 shows an illustration of a package 12 wherein the seal membrane 16 thereof has a parabolic shape that was either maintained during the application of the sub-atmospheric pressure, or that the seal membrane 16 returned to when the sub-atmospheric pressure was removed or its application ceased.

If, on the other hand, there is a puncture in the seal membrane 16 or a seal failure such that the vacuum within the package 12 has leaked, the seal membrane 16 will be drawn down to or at least towards the conveyor belt 26 by the applied sub-atmospheric pressure and will remain deformed (i.e., not return to its original parabolic shape) when the sub-atmospheric pressure is removed or its application ceased, since there is not a sufficient vacuum within the package 12 to cause the seal membrane 16 to return to its original parabolic shape. FIG. 4 shows an illustration of a package 12 wherein the seal membrane 16 has a deformed shape (i.e., a non-parabolic shape).

For purposes of this disclosure, applying a sub-atmospheric pressure to the seal membrane 16 as the package 12 moves through the vacuum plenum section 20 is intended to encompass a scenario wherein the conveyor 18 stops the conveyor belt 26 when a package to be inspected reaches the vacuum plenum section 20 to allow the application of a sub-atmospheric pressure to the seal membrane of the package, as well as a scenario wherein the package moves continuously through the vacuum plenum section 20 of the conveyor 18 without stopping. Additionally, in an embodiment, the vacuum plenum (and, in an embodiment, the vacuum source of the vacuum plenum section 20) is disposed below or beneath the conveyor belt 26 such that the sub-atmospheric pressure it creates draws the seal membrane 16 to or at least towards the conveyor belt 26. One benefit of the vacuum plenum being below the conveyor belt is that if there is a puncture in the seal membrane, the product in the container of the package covers the puncture allowing the foil to be deformed rather than allowing the atmosphere within the container to equalize, in which case the membrane would not deform.

As briefly described above, the system 10 further includes an imaging sensor 22. In an embodiment, the imaging sensor 22 is disposed above the conveyor 18 and is located or positioned at or downstream of the vacuum plenum section 20 of the conveyor 18. The imaging sensor 22 is configured to generate one or more images of the seal membrane 16 of a package 12 after or following the application of a sub-atmospheric pressure thereto (i.e., after the sub-atmospheric pressure is removed or its application ceased). Accordingly, in an embodiment such as that illustrated in FIG. 1 wherein the imaging sensor 22 is positioned downstream of the vacuum plenum section 20, once the sub-atmospheric pressure is no longer applied to the seal membrane 16 of the package 12 being inspected and the conveyor 18 moves the package 12 away from the vacuum plenum section 20, the imaging sensor 22 generates one or more images of the seal membrane 16. That or those images are communicated to the electronic processing device 24 of the system 10 where the image(s) may be processed as described below. In an embodiment, the imaging device 22 comprises a camera; though any other suitable imaging sensor may be used instead.

The electronic processing device 24 of the system 10 is configured to perform a number of functions. In the illustrated embodiment shown in FIG. 2, the electronic processing device 24 is electrically connected to, and may be configured to exert at least a measure of control over, one or more components of the system 10, for example, the conveyor system 18 (including, in an embodiment, the vacuum plenum section 20 thereof), the imaging sensor 22, and/or one or more other components of the system 10 described elsewhere herein. More specifically, the electronic processing device 24 may be configured to control the operation of the motor (identified by reference numeral 28 in FIG. 2) that drives the conveyor belt 26 to control the movement of the conveyor belt 26. The electronic processing device 24 may also or alternatively be configured to control the vacuum source (identified by reference numeral 30 in FIG. 2) of the vacuum plenum section 20 so as to control when and for how long a sub-atmospheric pressure is applied to the seal membrane 16 of a package 12 being inspected by the system 10. The electronic processing device 24 may still further be configured to control the operation of the imaging sensor 22 to control when an image of a seal membrane 16 is generated. In other embodiments, the electronic processing device 24 is not configured to control the operation of some or all of the components of the system 10, but rather one or more different electronic processing devices may be configured to do so.

The above notwithstanding, in an embodiment, the electronic processing device 24 is configured to receive one or more images generated by the imaging sensor 22, process that or those images, and evaluate the integrity of the seal of the package 12 based on the image(s) of the seal membrane 16. More specifically, in an embodiment, the electronic processing device 24 is configured to process the image(s) generated by the imaging sensor 22 of the seal membrane 16 of the package 12 being inspected to determine a shape of the seal membrane 16, and to then evaluate the integrity of the seal of the package 16 purportedly formed in part by the seal membrane 16 based on that determined shape. For example, as described above, if after the application of a sub-atmospheric pressure the seal membrane 16 has a parabolic shape, it can be determined that the seal is not compromised and that the package 12 is, in fact, sealed. On the other hand, if the seal membrane 16 does not have a parabolic shape, it can be determined that the seal is compromised, and thus, that the package is not sealed. Such a package may then be discarded or removed from the conveyor 18. Accordingly, the electronic processing device 24 is configured to use the image(s) generated by the imaging sensor 22 to determine the shape of the seal membrane 16, and to then determine whether or not the package 12 is sealed based on that determined shape.

The electronic processing device 24 may comprise a single processing device or a plurality of processing devices that collectively perform the functionality described herein. In the latter instance, the individual processing devices may be electrically connected to each other to allow communication therebetween. The electronic processing device 24 may include or comprise any variety of electronic processors, memory devices, input/output (I/O) devices, and/or other known components, and may perform various control, inspection, and/or communication-related functions.

In an embodiment, the electronic processing device 24 includes at least one electronic memory 32 that stores information utilized to, for example, perform some or all of the functionality relating to the methodologies described herein, and, in at least some embodiments and as described above, to control the operation of one or more components of the system 10. The electronic memory 32 may include, for example, random access memory (RAM), read only memory (ROM), hard disk(s), universe serial bus (USB) drive(s), memory card(s), or any type of suitable electronic memory means and may store a variety of data. This includes, for example, software (e.g., code or logic), firmware, programs, algorithms, scripts, and other electronic instructions that, for example, are required to perform one or more of the functions described herein; and, in an embodiment, various data structures for storing various information and data, including that required to perform some or all of the functions or method described herein.

The electronic processing device 24 may also include one or more electronic processors 34 (e.g., a microprocessor, a microcontroller, an application specific integrated circuit (ASIC), etc.) that executes instructions for software, firmware, programs, algorithms, scripts, etc. stored in the memory 32 that may govern and perform the processes and methods described herein. In an embodiment, the memory 32 is integrated in the processor 34, while in other embodiments the memory 32 is a separate component from the electronic processor 34 but is nevertheless accessible by the electronic processor 34.

The electronic processing device 24 may be electronically connected to other components of the system 10 (e.g., the conveyor system 18, the imaging sensor 22, etc.) via one or more wired or wireless connections across which that or those components and the electronic processing device 24 may communicate and interact, as required. Additionally, depending on the particular embodiment, the electronic processing device 24 may be a stand-alone unit or may be incorporated or included within another unit or module of the system 10. Accordingly, the electronic processing device 24 is not limited to any one particular embodiment or arrangement.

In addition to the components described above, in at least certain embodiments, the system 10 may include a number of other components. For example, as shown in FIGS. 1 and 2, the system 10 may include an inverter 36 that is configured to invert a package 12 on the conveyor belt 26 such that the seal membrane 16 rests on or is proximate or adjacent to the conveyor belt 26. In other words, a package that is "right side up" on the conveyor belt 26 is picked up, turned "upside down," and placed back onto the conveyor belt 26 by the inverter 36.

In the embodiment shown in FIG. 1, the inverter 36 is disposed upstream of the vacuum plenum section 20 of the conveyor 18 such that the package 12 to be inspected is inverted prior to or before the application of a sub-atmospheric pressure to the seal membrane 16 of the package 12 at the vacuum plenum section 20. In another embodiment, the inverter 36 may be located or positioned at or proximate the vacuum plenum section 20 such that the package 12 is inverted when it reaches the vacuum plenum section 20 (as opposed to before it reaches the plenum section 20), and, in an embodiment, before the application of the sub-atmospheric pressure to the seal membrane 16. In such an embodiment, the inverter 36 may also be configured to invert (or re-invert) the package after the application of the sub-atmospheric pressure to the seal membrane 16 (i.e., when application of the sub-atmospheric pressure ceases) such that the package 12 is rotated back to its "right side up" orientation wherein the base of the container 14 of the package 12 rests on the conveyor belt 26 and the top side of the seal membrane 16 faces away from the conveyor belt 26. This results in the seal membrane 16 being orientated such that it is in the field of view of the imaging sensor 22 positioned above the conveyor 18, and allows the imaging sensor 22 to generate one or more images of the seal membrane 16 following the application of the sub-atmospheric pressure thereto.

In another embodiment, rather than the same inverter 36 being configured to invert a package both before and after the application of a sub-atmospheric pressure to the seal membrane of the package, the inverter 36 is configured to invert the package before the application of the sub-atmospheric pressure, and another inverter of the system 10 is configured to invert the package after the application of a sub-atmospheric pressure to the seal membrane. For example, in the illustrative embodiment shown in FIGS. 1 and 2, the system 10 includes a second inverter 38 that is configured to invert a package after the application of a sub-atmospheric pressure to the seal membrane thereof such that the package is turned back to its "right side up" orientation wherein the base of the container rests on the conveyor belt 26 and the seal membrane of the package faces away from the conveyor belt 26. As described above, the inversion (or re-inversion) of the package results in the seal membrane 16 being orientated in such a way that it is in the field of view of the imaging sensor 22 positioned above the conveyor 18, thereby allowing the imaging sensor 22 to generate one or more images of the seal membrane 16 following the application of the sub-atmospheric pressure thereto. In such an embodiment, the inverter 38 may be disposed at or proximate the vacuum plenum section 20 of the conveyor 18. However, in other embodiments, for example, that shown in FIG. 1, the inverter 38 may be disposed downstream of the vacuum plenum section 20. The latter arrangement ensures that the sub-atmospheric pressure created at the vacuum plenum section 20 is not applied to the seal membrane when the package is being inverted by the inverter 38.

Whether the system 10 includes one or multiple inverters, each of the inverters may comprise any suitable inverter known in the art. For example, in an embodiment, each of the inverters may comprise a robotic arm having an end-of-arm tool that is suitable to grip a package. The electronic processing device 24 or another suitable processing device of the system 10 may be configured to control the operation of the robotic arm and tool to pick-up a package 12 from the conveyor belt 26, invert the package 12, and then place it back onto the conveyor belt 26. It will be appreciated, however, that any other suitable inverter may be used instead.

In at least certain embodiments, the system 10 may include further a second imaging sensor 40 that is configured for use in performing a gross inspection of a package 12 prior to the inversion of the package 12 by the inverter 36 (if applicable) and the application of a sub-atmospheric pressure to the seal membrane 16 of the package 12 at the vacuum plenum section 20 of the conveyor 18. In an embodiment, like the imaging sensor 22 described above, the imaging sensor 40 is disposed above the conveyor belt 26 and located or positioned at or upstream of the vacuum plenum section 20 of the conveyor 18. In an embodiment wherein the system 10 includes the inverter 36, the imaging sensor 40 is also located or positioned upstream of the inverter 36. The imaging sensor 40 is configured to generate one or more images of the seal membrane 16 of a package 12 being inspected prior to the application of a sub-atmospheric pressure thereto and, if applicable, prior to the inversion of the package 12. In operation, the image(s) generated by the imaging sensor 40 is/are communicated to the electronic processing device 24 of the system 10 (or to another suitable processing device of the system 10) where the image(s) may be processed and used to determine, for example, whether a vacuum was ever formed in the container of the package 12, and thus, whether there is a gross defect with the package or a malfunction of the sealing process.

More specifically, in an embodiment, the electronic processing device 24 is configured to process the image(s) generated by the imaging sensor 40 to determine a shape of the seal membrane 16 of the package 12 being inspected, and to then evaluate, based on the determined shape, whether a vacuum was ever formed, and thus, whether there is a gross defect with the package 12 or a malfunction of the sealing process. For example, if the seal membrane 16 has a parabolic shape, it can be determined that a vacuum did, in fact, form in the package 12, and thus, there is no gross defect. On the other hand, if the seal membrane 16 does not have a parabolic shape, it can be determined that a vacuum did not form in the package 12 or has been lost, and thus, that there is a gross defect. Such a package 12 may then be discarded or removed from the conveyor 18 before it is inverted and/or a sub-atmospheric pressure is applied to the seal membrane 16 thereof at the vacuum plenum section 20 of the conveyor 18 and the sealing process can be evaluated and any problems may be corrected. Accordingly, in an embodiment, the electronic processing device 24 is configured to use the image(s) generated by the imaging sensor 40 to determine the shape of the seal membrane 16, and to then determine whether or not a vacuum was formed in the package 12, and thus, whether or not there is a gross defect with the package 12, based on that determined shape; the processing device may also alert the operator or stop the sealing process so that problems may be corrected.

As with the imaging sensor 22 described above, in an embodiment, the imaging device 40 comprises a camera; though any other suitable sensor may be used instead.

Figure 5:
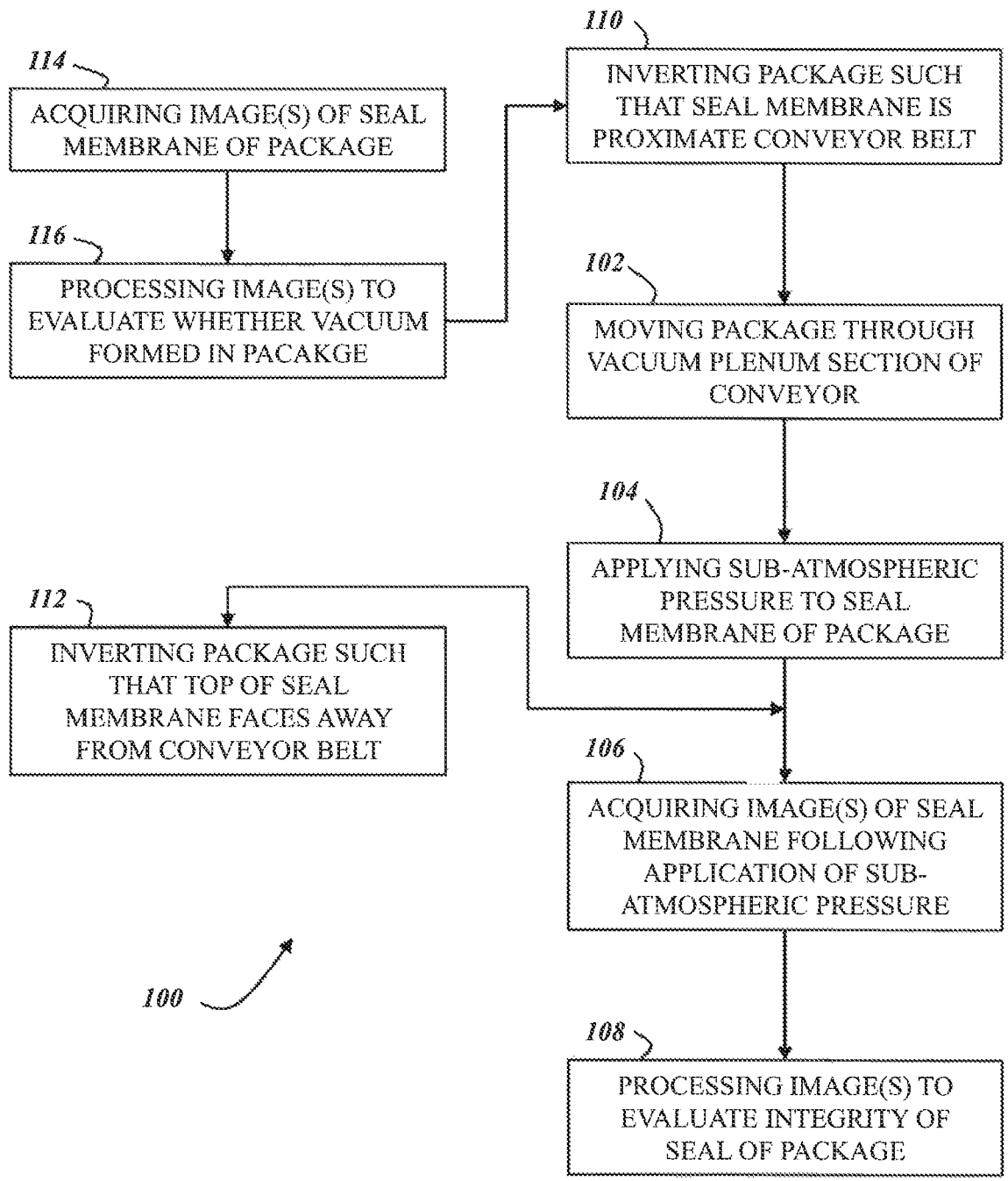
FIG. 5 is a flow diagram showing various steps of an illustrative embodiment of a method for inspecting the integrity of a seal of a package.

Turning now to FIG. 5, there is shown an example of a method 100 for inspecting the integrity of a seal of package that includes a container and a seal membrane. For purposes of illustration and clarity, method 100 will be described in the context of the system 10 described above and illustrated in FIGS. 1 and 2. It will be appreciated, however, that the application of the present methodology is not meant to be limited solely to such an arrangement, but rather method 100 may find application with any number of arrangements (i.e., steps of method 100 may be performed by components of the system 10 other than those described below, or arrangements of the system 10 other than that described above).

In an embodiment, method 100 comprises a step 102 of moving, by the conveyor 18, a package 12 on the conveyor belt 26 thereof that is to be inspected through the vacuum plenum section 20 of the conveyor 18. In a step 104, a sub-atmospheric pressure is applied to the seal membrane 16 of the package 12 as the package 12 passes through the vacuum plenum section 20. In an embodiment, step 104 may comprise stopping the conveyor belt 26 when the package 12 reaches the vacuum plenum section 20, and then applying the sub-atmospheric pressure. In another embodiment, step 104 may comprise continuously moving the package 12 through the vacuum plenum section 20 and applying the sub-atmospheric pressure as the package moves therethrough without stopping the conveyor belt 26.

Method 100 includes further a step 106 of acquiring, by the imaging sensor 22, one or more images of the seal membrane 16 of the package 12 following the application of the sub-atmospheric pressure thereto, and a step 108 of processing, by the electronic processing device 24, that or those acquired images to evaluate the integrity of the seal of the package based on the acquired image(s). In an embodiment, step 108 comprises processing the one or more images generated by the imaging sensor 22 to determine a shape of the seal membrane 16, and then evaluating the integrity of the seal of the package 12 based on that determined shape. For example, as described above, if after the application of a sub-atmospheric pressure the seal membrane has a parabolic shape, it can be determined that the seal is not compromised and that the package is, in fact, sealed. On the other hand, if the seal membrane does not have a parabolic shape, it can be determined that the seal is compromised, and thus, that the package is not sealed. Such a package may then be discarded or removed from the conveyor 18. Accordingly, in an embodiment, step 108 comprises using the image(s) generated by the imaging sensor 22 to determine the shape of the seal membrane 16, and then determining, based on that determined shape, whether or not the package 12 is sealed.

In an embodiment such as that illustrated in FIG. 5, method 100 may include one or more additional steps. For example, method 100 may include a step 110 of inverting, by the inverter 36, the package 12 prior to the application of a sub-atmospheric pressure in step 104. Method 100 may include further a step 112 of inverting (or re-inverting), by the inverter 36 or the inverter 38, the package 12 following or after the application of a sub-atmospheric pressure in step 104. In an embodiment wherein method 100 includes both step 110 and step 112, step 112 is performed after step 110, as shown in FIG. 5.

Method 100 may include further a step 114 of acquiring, by the imaging device 40, one or more images of the seal membrane 16 of the package 12 prior to the application of a sub-atmospheric pressure in step 104. In an embodiment wherein method 100 includes step 114, it may further include a step 116 of processing, by the electronic processing device 24, that or those images to evaluate whether a vacuum was formed in the package 12 during a sealing process performed on the package 12, and thus, whether there is a gross defect with the package or a malfunction of the sealing process. In an embodiment, step 116 is performed prior to step 104 and, if applicable, step 110.

There thus has been disclosed a system for tracking containers that fully satisfy one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. An apparatus for inspecting the integrity of a seal of a package that includes a container and a seal membrane carried thereby, comprising:
   a conveyor configured to move said package along a path and including a vacuum plenum section configured to create a sub-atmospheric pressure that is applied to said seal membrane of said package as said package moves through said vacuum plenum section;
   an imaging sensor configured to generate one or more images of said seal membrane following the application of a sub-atmospheric pressure thereto at said vacuum plenum section; and
   an electronic processing device configured to:
      process said one or more images of said seal membrane generated by said sensor; and
      evaluate the integrity of the seal of said package based on said one or more images.

2. The apparatus of claim 1, further comprising an inverter configured to invert said package prior to the application of a sub-atmospheric pressure to said seal membrane of said package.

3. The apparatus of claim 2, further comprising an inverter configured to invert said package following the application of a sub-atmospheric pressure to said seal member of said package and prior to the generating of one or more images of said seal membrane.

4. The apparatus of claim 3, wherein said inverter configured to invert said package prior to the application of a sub-atmospheric pressure to said seal member, and said inverter configured to invert said package following the application of a sub-atmospheric pressure to said seal member are the same.

5. The apparatus of claim 3, wherein said inverter configured to invert said package prior to the application of a sub-atmospheric pressure to said seal member, and said inverter configured to invert said package following the application of a sub-atmospheric pressure to said seal member comprise two different inverters.

6. The apparatus of claim 1, wherein said vacuum plenum section comprises a vacuum plenum disposed beneath said conveyor.

7. The apparatus of claim 1, wherein said imaging sensor is disposed above said conveyor.

8. The apparatus of claim 1, wherein the electronic processing device is configured to evaluate the integrity of the seal of said package by determining if the seal of the package has been compromised.

9. The apparatus of claim 1, wherein said package is a hot-filled package, and said seal membrane comprises a foil seal membrane.

10. The apparatus of claim 1, wherein said electronic processing device is configured to process said one or more images of said seal membrane to determine a shape of said seal membrane, and to evaluate the integrity of the seal of said package based on said determined shape of said seal membrane.

11. The apparatus of claim 1, wherein said imaging sensor is a first imaging sensor and said apparatus further comprises a second imaging sensor configured to generate one or more images of said seal membrane of said package prior to the application of a vacuum to said seal membrane, said electronic processing device configured to:
   process said one or more images generated by said second imaging sensor; and
   evaluate whether a vacuum was formed in said package based on said one or more images generated by said second imaging sensor.

12. The apparatus of claim 11, wherein said electronic processing device is configured to process said one or more images of said seal membrane to determine a shape of said seal membrane, and to evaluate whether a vacuum was formed in said package based said determined shape of said seal membrane.

13. An apparatus for inspecting the integrity of a seal of a package that includes a container and a seal membrane carried thereby, comprising:
   a conveyor configured to move said package along a path and including a vacuum plenum section configured to create a sub-atmospheric pressure that is applied to said seal membrane of said package as said package moves through said vacuum plenum section, wherein said vacuum plenum section comprises a vacuum plenum disposed beneath said conveyor;

a first inverter configured to invert said package prior to the application of a sub-atmospheric pressure to said seal membrane at said vacuum plenum section of said conveyor;

a second inverter configured to invert said package following the application of a sub-atmospheric pressure to said seal membrane at said vacuum plenum section of said conveyor;

an imaging sensor configured to generate one or more images of said seal membrane following the application of a sub-atmospheric pressure hereto at said vacuum plenum section and the inversion of said package by said second inverter; and an electronic processing device configured to:
process said one or more images of said seal membrane generated by said sensor; and
evaluate the integrity of the seal of said package based on said one or more images.

14. The apparatus of claim 13, wherein said electronic processing device is configured to process said one or more images of said seal membrane to determine a shape of said seal membrane, and to evaluate the integrity of the seal of said package based on said determined shape of said seal membrane.

15. The apparatus of claim 13, wherein said imaging sensor is a first imaging sensor and said apparatus further comprises a second imaging sensor configured to generate one or more images of said seal membrane of said package prior to the application of a vacuum to said seal membrane, said electronic processing device configured to:
process said one or more images generated by said second imaging sensor; and
evaluate whether a vacuum was formed in said package based on said one or more images generated by said second imaging sensor.

16. The apparatus of claim 15, wherein said electronic processing device is configured to process said one or more images of said seal membrane to determine a shape of said seal membrane, and to evaluate whether a vacuum was formed in said package based said determined shape of said seal membrane.

17. A method for inspecting the integrity of a seal of a package that includes a container and a seal membrane carried thereby, comprising:

moving, by a conveyor, said package through a vacuum plenum section of said conveyor;

applying, by the vacuum plenum section, a sub-atmospheric pressure to said seal membrane of said package as said package passes through said vacuum plenum section;

acquiring, by an imaging sensor, one or more images of said seal membrane following said application of said sub-atmospheric pressure thereto;

processing, by an electronic processing device, said one or more images to evaluate the integrity of the seal of said package based on said one or more images of said seal membrane.

18. The method of claim 17, further comprising inverting said package prior to applying a sub-atmospheric pressure to said seal membrane of said package.

19. The method of claim 17, further comprising inverting said package following the application of a sub-atmospheric pressure to said seal membrane of said package and prior to said acquisition of said one or more images of said seal membrane.

20. The method of claim 17, wherein said processing step comprises processing said one or more images of said seal membrane to determine a shape of said seal membrane, and evaluating the integrity of the seal of said package based on said determined shape of said seal membrane.

21. The method of claim 17, further comprising:

acquiring one or more images of said seal membrane of said package prior to the application of a sub-atmospheric pressure to said seal membrane in said applying step; and processing said one or more images to evaluate whether a vacuum was formed in said package during a sealing process performed on said package.

* * * * *